United States Patent [19]

Gardner

[11] 4,442,695
[45] Apr. 17, 1984

[54] CONDUIT BENDER WITH ANGLE INDICATIONS

[76] Inventor: William E. Gardner, 4448 Trillium La., Slinger, Wis. 53086

[21] Appl. No.: 419,802

[22] Filed: Sep. 20, 1982

[51] Int. Cl.³ .............................................. B21J 13/08
[52] U.S. Cl. .......................................... 72/459; 72/32
[58] Field of Search ................... 72/458, 459, 457, 31, 72/32, 34, 310

[56] References Cited

U.S. PATENT DOCUMENTS

| | | | |
|---|---|---|---|
| 2,817,986 | 12/1957 | Benfield | 72/459 |
| 3,063,314 | 11/1962 | Benfield et al. | 72/458 |
| 3,253,441 | 5/1966 | Benfield | 72/31 |
| 3,718,018 | 2/1973 | Benfield | 72/31 |
| 4,009,602 | 3/1977 | Linquist | 72/459 |
| 4,052,881 | 10/1977 | Mount | 72/459 |
| 4,269,056 | 5/1981 | Kozinski | 72/459 |

Primary Examiner—Daniel C. Crane
Assistant Examiner—David B. Jones
Attorney, Agent, or Firm—James E. Nilles; James R. Custin

[57] ABSTRACT

A tool for bending conduit comprises a body that has a bottom shoe portion which is curved along its length and in which there is a downwardly opening groove that is symmetrical across its width to a plane of symmetry, a tubular handle supporting socket projecting up from the shoe with its axis in said plane, and a hook portion in front of the shoe. Integral ridges on the body define sighting lines contained in a plane parallel to said plane of symmetry, each such line designating attainment of a predetermined bend angle when it is perpendicular to a supporting surface. The ridges define upper line segments on the socket that diverge downwardly from a point on the axis about which the shoe is lengthwise curved and lower line segments on the shoe that are lengthwise aligned with respective upper line segments.

9 Claims, 6 Drawing Figures

CONDUIT BENDER WITH ANGLE INDICATIONS

FIELD OF INVENTION

This invention relates to tools for bending electrical conduit and similar pipes and tubes, and the invention is more particularly concerned with a bending tool having a body which can be formed in one piece and which has integral means for indicating as the tool is being used the angle to which a piece of tubing has been bent.

BACKGROUND OF THE PRIOR ART

Tools for bending tubes, pipes and conduits are of a well-known type, usually comprising a one-piece body that has an elongated, downwardly grooved arcuate shoe at its bottom, a hook at its front, and an upwardly projecting handle socket in which a handle is removably receivable. The hook is engaged under a length of tubing to be bent, which is held down against a floor or other supporting surface, and bending force exerted upon the handle, transmitted to the tube by means of the hook, curves the tube around the shoe.

With most such tools heretofore available, there was no way of directly determining, during use of the tool, the angle of bend that had been imparted to the tube being bent. Usually, therefore, the user had to terminate the bending operation when he estimated that the desired bend angle had been achieved, then measure the actual bend angle, and then often as not make one or more further bends and measurements until the desired angle had been obtained.

U.S. Pat. No. 2,953,048, issued to J. A. Brown in 1960, disclosed an angle readout device in the form of an accessory for attachment to a bending tool. It was one of several prior attempts to solve the problem to which the present invention is directed, and, like the others, it had marked deficiencies. The device of the Brown patent was detachably secured to the removable handle of the bending tool by means of a clamp that was installed on the handle at a distance above its socket on the tool body. The clamp supported a medially pivoted lever that was swingable relative to the handle and a dial that it held stationary on the handle. One arm of the lever served as a pointer that cooperated with the dial, and the opposite arm terminated in a follower that rested on the tube to be bent, at a location some distance to the rear of the tool body. As the handle of the tool was swung during a tube bending operation, the dial moved with the handle and relative to the lever to provide indications of bend angle. Accuracy of the device was dependent upon accurate location of its clamp both lengthwise and rotationally along the handle, since the location of the lever pivot determined the angle of the follower lever in any given position of the handle. Installing and adjusting the device was thus likely to take more time than could be saved by its use in making a few bends, so that it was actually inefficient for many jobs. Furthermore, its long, freely swingable follower lever made the tool awkward to carry and complicated the engagement of the tool proper with tubing to be bent.

An earlier (1954) U.S. patent to J. W. Lewin, No. 2,666,351, had disclosed a somewhat similar angle indicating attachment for a tube bender, likewise intended to be attached to the handle for the tool. Lewin's device comprised a stop arm that was intended to be locked in any one of a number of designated angle positions and to strike the floor or other supporting surface when a tube bend had attained the angle for which the arm was adjusted. Although less cumbersome than the device of the above-discussed Brown patent, that of the Lewin patent was nevertheless far from compact, and it had the further disadvantage of needing adjustment each time a different angle was to be bent.

U.S. Pat. No. 3,718,018, issued in 1973 to J. D. Benfield, disclosed a bending tool having a step-like series of upper surfaces that were disposed at acute angles to one another, each bearing an indication of bend angle. The tool was operated in the conventional manner, and to produce a bend of a desired angle the handle of the tool was swung until the surface marked with the desired angle of bend was brought to a horizontal orientation. This development was obviously not very satisfactory in actual use because of the extreme difficulty of judging the point at which a relatively small surface, viewed from above, has swung to an exactly horizontal attitude; but the patent demonstrates that the art was seeking a compact indicator, formed integrally with the bender body and having no substantial projections that might be bent or broken under the high forces imposed upon a bending tool both in its use and in other handling.

To avoid the need for judging the attitude of the tube bender body relative to horizontal, U.S. Pat. No. 4,052,881, issued in 1977 to R. W. Mount, disclosed a glass tube that was arcuately curved along its length and was mounted on an upwardly facing surface on the bender body, and a pair of balls that rolled along inside the tube to remain at its lowest point and cooperate with calibrations along the tube for designating the angle of bend that had been achieved. This device was obviously rather expensive, and the glass tube was of course somewhat fragile in relation to the treatment that a bending tool is likely to receive.

A generally similar solution to the problem, with similar deficiencies, is presented by certain commercially available tube benders wherein two spirit levels are mounted on the tool body, at an angle to one another, each oriented to center its bubble when a predetermined bend angle is reached.

A tube bender having an integral angle indicating device is disclosed in U.S. Pat. No. 4,009,602, issued in 1977 to W. A. Linquist. The tube bender of that patent has enjoyed some commercial success, probably because its angle indicating means is sturdy, compact, and accurate enough to be helpful. It comprises small protuberances formed integrally with the body of the bending tool and projecting to one side of the body near the front of it. One of these protuberances, which can be regarded as an upper sighting element, is formed on a reinforcing web that extends forwardly to connect the handle supporting portion of the body with the hook on the front end of the body. Several more such protuberances are formed at intervals along the arcuate shoe at the bottom of the body, to provide lower sighting elements, and there is one more such lower sighting element on the handle supporting portion, intermediate its top end and the shoe. In use, a desired angle of bend is assumed to be achieved when the upper sighting element comes into alignment with a selected one of the lower sighting elements, each of which corresponds to a desired bend angle. A major disadvantage of this indicating device is that the indicated angle of bend will not be the actual angle achieved unless the user's eye is on a line through the upper sighting element that is perpendicular to the surface which supports the tube being bent. If the eye is forward or rearward of the perpendicular line—which shifts rearward with the upper sighting element as the tool is rocked through a bending motion—the selected lower sighting element will come into apparent alignment with the upper one when the actual bend angle is less than or greater than the selected one. Furthermore, judgment of the needed perpendicular is made very difficult by the fact that the user is given only two points to work with and must therefore visualize the line through them as well as estimating its attitude relative to the floor or other supporting surface. The orientation of the handle is of no assistance in this respect, since its axis is spaced to one side of every defined sighting line and is, at best, parallel to only one such line. And, as indicated above, judgment of the perpendicular is further complicated by the confusing rearward migration of the upper sighting element that takes place as the tool is rocked through a bending operation.

It will be apparent from this brief survey of the prior art that the provision of a completely satisfactory bend angle indicator for a tube bending tool has defied not only ordinary skill in the art but also several exercises of inventive ingenuity.

SUMMARY OF THE INVENTION

A general object of the present invention is to provide a tool for bending tubing, pipes, conduit and the like, having a body which is formed in one piece, as is generally conventional, and having on its body sturdy integral marker means that afford a clear visual indication to the user whenever each of a plurality of predetermined bend angles has been imparted to a length of tubing being bent by the tool.

Another general object of the present invention is to provide a one-piece bending tool body of the character described having integrally formed linear markers thereon that designate each of a plurality of commonly used angles to which tubing can be bent, said markers being so arranged that the user of the tool can very readily judge when the line defined by an angle marker has come into perpendicular relationship to the surface that supports the tubing being bent.

Another and more specific object of the invention is to provide, on the body of a tube bender of the character described, integrally formed markers that designate each of a plurality of angles to which tubing is commonly bent, each such marker defining visually perceptible line segments, and the line segments for each angle marker being so arranged that when tubing has been bent to an angle denoted by the marker, said line segments come into visual alignment with one another and into coincidence with the imaginary line perpendicular to the surface that supports the tubing, said markers being further so arranged in relation to one another and in relation to parts of the tool body as to greatly facilitate accurate estimation of that perpendicular.

It is also a specific object of the invention to provide a bending tool of the character described having integrally formed bending angle markers on its one-piece body that are practically indestructible, the angle markers being so formed and arranged that a substantial portion of any one of them can be broken away without materially affecting its utility or accuracy.

Another specific object of this invention is to provide a bending tool having bend angle indicators of the character described that can be employed with equal facility by right-handed and left-handed users of the tool.

In general, these and other objects of the invention that will appear as the description proceeds are realized in a tool for bending conduit and the like that is generally conventional insofar as it comprises an elongated body having an arcuate bottom surface against which conduit is forced for producing a bend therein and which defines a downwardly opening conduit receiving groove that extends lengthwise along the body and is from side to side symmetrical to a plane of symmetry substantially contained in the body, said body also having a conduit engaging hook on one end thereof and further having an upwardly projecting handle supporting portion that has its axis contained in said plane. The characterizing feature of the tool of this invention is that its body has at one side thereof surfaces with elongated edges that define a plurality of sighting lines which lie in a sighting plane parallel to said plane of symmetry and which extend at acute angles to one another in downwardly divergent relation from a point near the top of said handle supporting portion; and each said sighting line is defined by edge portions of said surfaces that are downwardly adjacent to said point and other edge portions of said surfaces that are adjacent to the bottom of the body. Preferably said point is concentric to an arc about which the bottom surface of the body is curved, and a line through said point that is perpendicular to the plane of symmetry intersects the axis of the handle supporting surface. To facilitate employment of the tool by both right-handed and left-handed users, similar surfaces, having similar elongated edges defining corresponding sighting lines, are also provided at the other side of the tool.

BRIEF DESCRIPTION OF DRAWINGS

In the accompanying drawings, which illustrate what is now regarded as a preferred embodiment of the invention.

DETAILED DESCRIPTION OF PREFERRED EMBODIMENT OF THE INVENTION

Figure 3:
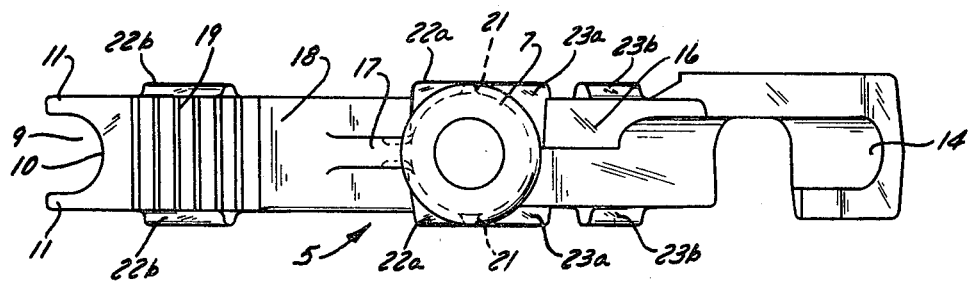
FIG. 3 is a top view of the tool body.
Figure 1:
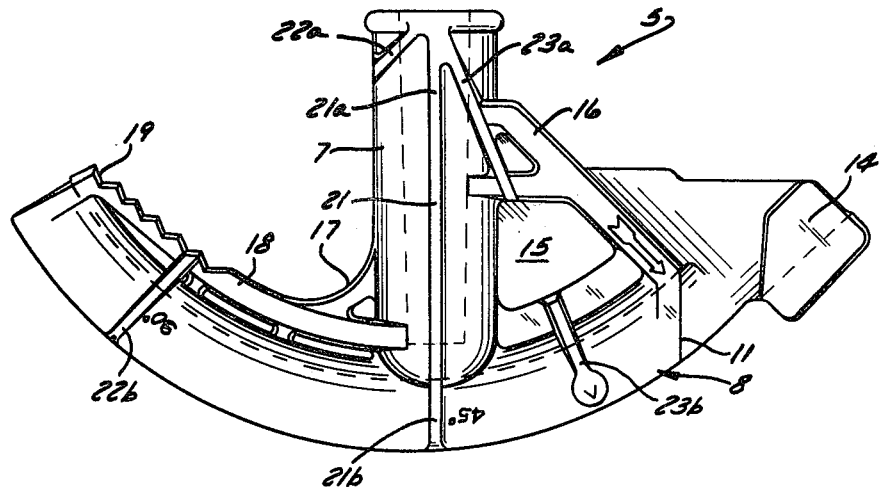
FIG. 1 is a view in side elevation of the body of a bending tool embodying the present invention.
Figure 4:
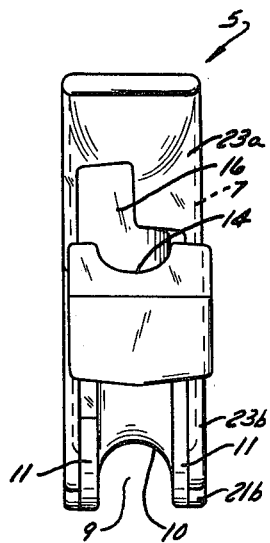
FIG. 4 is a view of the tool body in front elevation.
Figure 2:
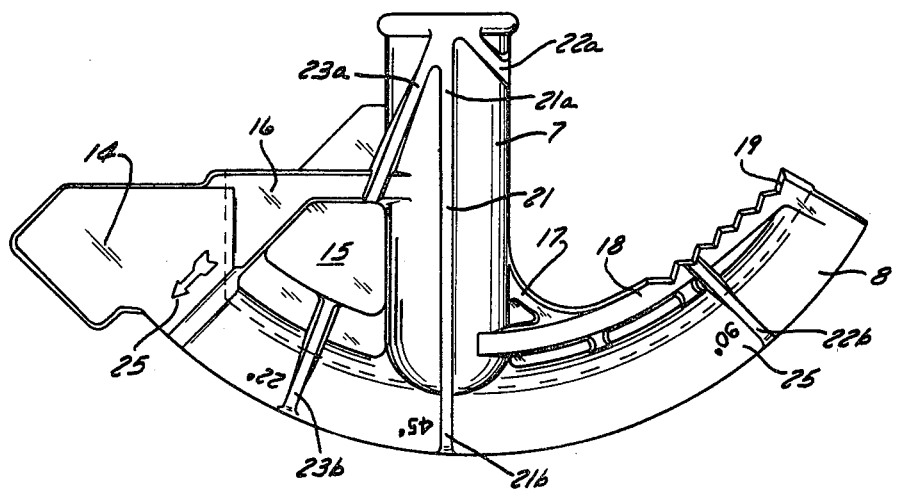
FIG. 2 is a view of the tool body in side elevation, as seen from its side opposite that shown in FIG. 1.
Figure 5:
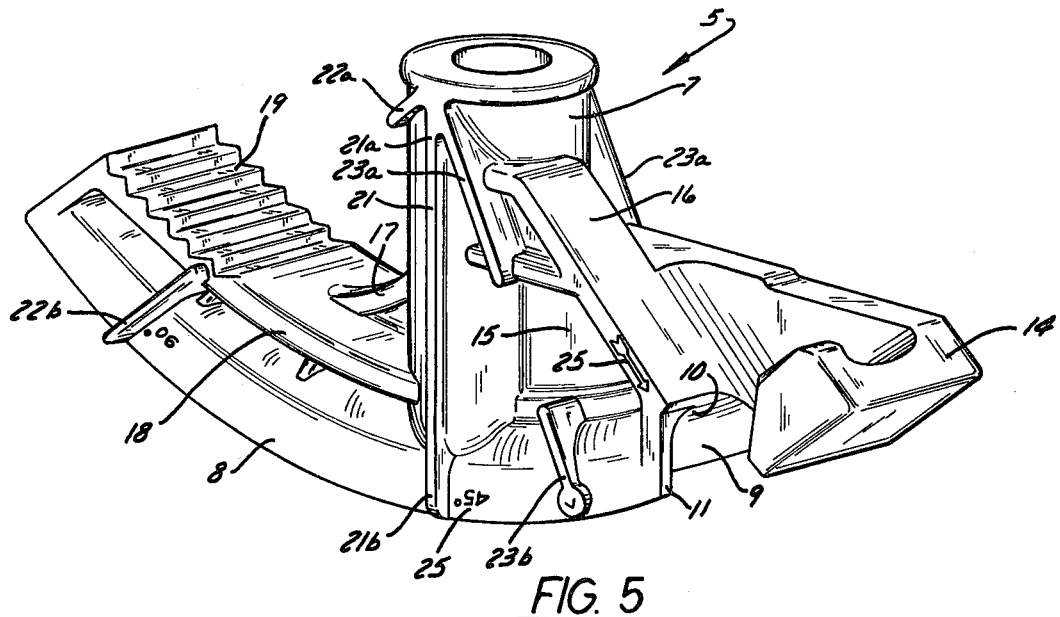
FIG. 5 is a front perspective view of the tool body.

A bender for tubing, pipe, conduit and the like that embodies the principles of this invention comprises a sturdy body 5 that can be formed as a one-piece casting, together with an elongated shaft-like handle 6 which can be made of rigid steel tubing and which is removably received in an upwardly projecting socket-like handle supporting portion 7 of the body. The body 5 is elongated, extending substantial distances both forwardly and rearwardly from its handle supporting portion 7.

A bottom portion 8 of the body 5 comprises a shoe that is curved along its length to a convex arc. At its bottom the shoe 8 has a downwardly opening conduit-receiving groove 9 that extends along the full length of the shoe. The width and the depth of the groove 9 are equal to the diameter of tubing to be bent by means of the tool, and the surface 10 of the inner half of the groove is concavely curved across its width on a radius substantially equal to that of the tubing. Thus the flange-like bottom portions 11 of the shoe 8 that extend along it at opposite sides of its groove 9 can rockingly engage a floor or other surface as the shoe straddles a conduit 12 to be bent.

The groove 9 is symmetrical from side to side relative to a plane of symmetry that lies inside the body 5. The handle supporting socket 7, which is substantially cylindrical, has its axis contained in the plane of symmetry of the groove 9, and the handle socket axis preferably coincides with a radial through a point about which the shoe 8 is concentrically curved along its length. The handle 6, which will normally be straight along its length, is received in a coaxial upwardly opening well in the socket 7.

The front end portion of the body 5 comprises a forwardly projecting upwardly opening hook 14. To support the high stresses that are imposed during a bending operation upon the handle socket 7 and the hook 14, those two portions of the bender body are connected by a front vertical web 15 which is also joined to the shoe 8. Upper portions of the web 15 can be substantially thickened, as at 16, to define reinforcing struts which extend between the handle socket 7 and front portions of the body 5. A smaller rear vertical web 17 connects the handle socket 7 with a laterally extending web-like reinforcement 18 that overlies the rear portion of the shoe 8 and curves lengthwise along it. The rearmost portion of the reinforcing web 18 has its upper surface transversely ridged to define a pedal 19 upon which a user of the tool can place one foot, to hold the bottom flanges 11 of the shoe against the floor and to produce a bending force which supplements the force applied to the handle 6.

Bending a length of conduit 12 with the tool of this invention is generally conventional in that the hook 14 is engaged under the conduit and then, with the conduit otherwise supported by the floor, and with the shoe straddling the conduit, force is applied to the pedal 19 and the handle 6 in the direction to swing the handle rearward. This rocks the body on its flanges 11, raising the hook 14 which cooperates with the floor to bend the conduit around the shoe 8.

The arcuate bend that is imparted to the conduit or tubing as the tool body 5 is rocked on its flanges 11 has a radius substantially equal to that of the arc to which the shoe 8 is curved along its length. But the bend angle produced in the conduit is of course dependent upon the distance through which the handle 6 is swung rearward during the bending operation.

Figure 6:
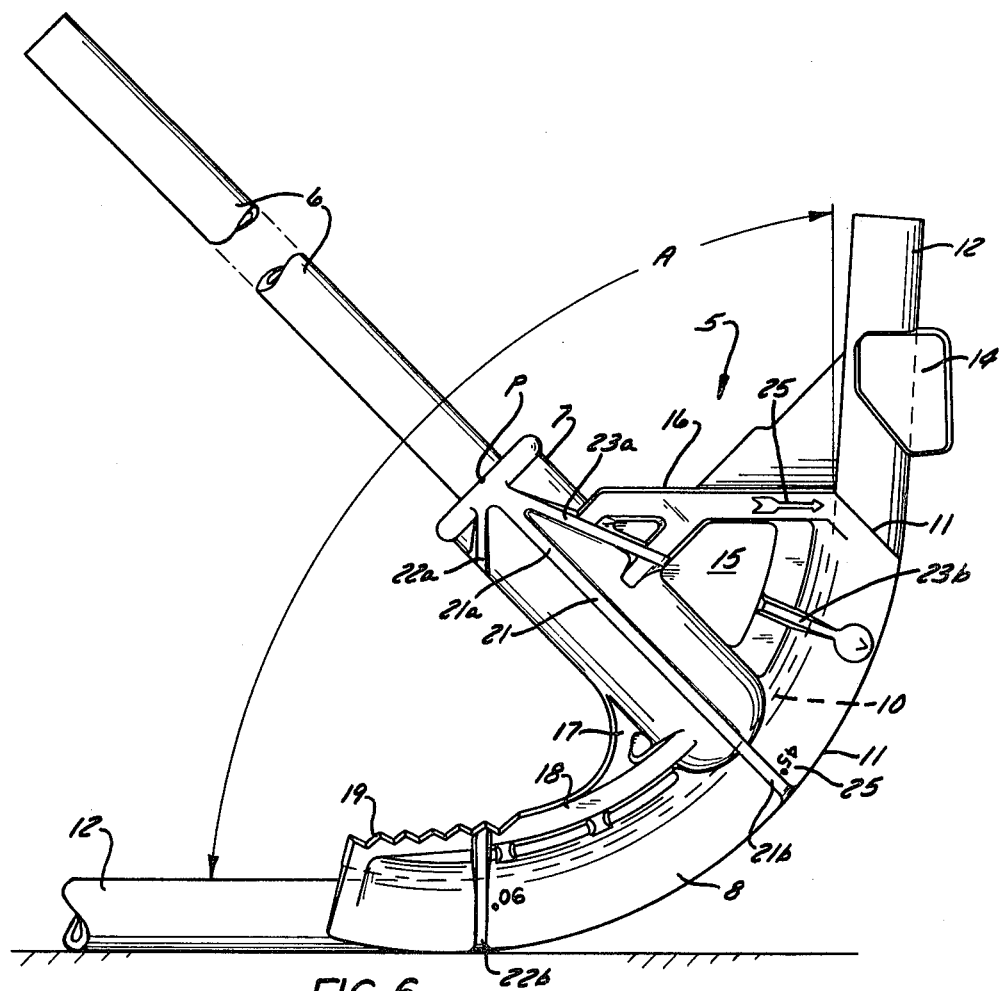
FIG. 6 is a view of the tool in elevation, as seen from the side of the body shown in FIG. 1, illustrating the tool in its operative relationship to a length of conduit being bent and to a floor or other supporting surface.

This bend angle—sometimes referred to herein as the angle of bend—is the angle designated by A in FIG. 6. Specifically, it is the angle between the straight sections of conduit that are at opposite ends of the curve imparted to the conduit by means of the tool. The particular bend angles most frequently needed in practical work with a bending tool are 22½°, 45° and 90°, and the accompanying drawings illustrate a tool which indicates the attainment of each of those bend angles; but it will be understood that the principles of the invention can be embodied in a tool that indicates additional or other selected bend angles.

In general, the bend angle indicating means of this invention comprises a set of straight, narrow ribs or ridges 21, 22a–22b, 23a–23b that are formed on one side of the tool body 5, and preferably an identical set of ribs or ridges is also formed on the other side of the body. The ribs or ridges of each set define straight sighting lines, each corresponding to a selected bending angle and all lying in a common sighting plane that is parallel to the above-mentioned plane of symmetry of the groove 9. Each sighting line is defined by lengthwise aligned upper and lower ridge segments. The several upper ridge segments 21a, 22a and 23a are downwardly divergent from a point P that is at or near the top of the handle supporting socket 7, and that point P is on the axis of the arc of curvature of the shoe 8. Each of the lower ridge segments 21b, 22b, 23b is formed on the shoe portion 8 of the body and has its bottom end close to the bottom of the shoe. The ridge or rib 21, which designates the 45° bend angle, has its upper and lower segments 21a, 22a, respectively, lengthwise continuous with one another, and it thus extends down along the handle supporting socket 7 in a plane which is transverse to the plane of symmetry of the groove 9 and which contains the axis of the handle socket 7.

The user of the tool looks down on the body 5 from some distance above it as he rocks the tool body during the bending of a tube, and as he achieves each in turn of the designated bending angles, he sees the upper and lower ridge segments for the bending angle come into alignment with each other. Because a set of ribs or ridges is preferably formed at each side of the tool, use of the tool is equally convenient for right-handed and left-handed persons. Each designated bending angle is actually achieved when the line segments for that angle coincide with a line accurately perpendicular to the supporting surface, but several factors contribute to the facility with which the perpendicular can be estimated accurately. The fact that the ribs or ridges define distinctly visible lines enables the relationship between each such line and the supporting surface to be viewed directly. The user is further aided by the fact that the bottom end of each lower ridge segment is very close to the bottom of the shoe 8, so that perpendicularity can be judged by the proximity of the bottom end of the ridge to the supporting surface. Since all of the angle defining lines meet at the axis of curvature of the shoe 8, there are no optical illusions due to eccentricity of the point of origin of the lines. Further, the visible divergence of the upper segments 21a, 22a, 23a from the point P provides further visual clues to perpendicularity or lack of perpendicularity of any particular angle designating line in relation to the supporting surface.

In general it will be apparent that the line segments which designate the various bending angles can be defined by straight edges on any suitable surfaces on the tool body, provided that such edges are reasonably conspicuous and that all such edges at each side of the tool lie in a common sighting plane. Using ribs or ridges of course has the advantage that their edges which define the significant line segments are unmistakably apparent. Furthermore, ridges or ribs formed as illustrated in the accompanying drawings do not materially increase the weight of the tool body and can in fact contribute a certain amount of desirable reinforcement to highly stressed portions of it, as will be particularly evident in the case of the rib portions that define sighting line segments 22b and 21b.

It will be apparent that if a part of one of the ridges should be dented or broken away by accident or rough treatment, the sighting line along that ridge will nevertheless remain well defined; and thus the bend angle indicators of this invention can be said to be practically indestructible.

The tool body can of course be provided, as is generally conventional, with integral indicia 25 which can be aligned with measured and marked points on the conduit to be bent, so that the bend will be produced at a desired location along the length of the conduit.

From the foregoing description taken with the accompanying drawings it will be apparent that this invention provides a tool for bending conduit, pipe and tubing that provides a direct, clearly visible and accurate indication of the attainment during a bending operation of each of a plurality of predetermined bending angles; and it will also be apparent that the indicating means of this invention is both extremely compact and extremely sturdy, can be used with equal facility by right-handed and left-handed persons, and can be formed integrally with the one-piece casting that normally comprises the tool body.

What is claimed as the invention is:

1. A tool for bending conduit and the like whereby conduit can be curved to establish a selected one of a plurality of predetermined bend angles therein, said tool comprising a body that has an elongated shoe portion with a bottom surface which is curved to a convex arc along its length and which is concavely curved from side to side symmetrically to a plane of symmetry, a substantially cylindrical handle supporting portion that projects upwardly from said shoe portion intermediate the ends thereof with its axis in said plane, and an upwardly opening hook portion projecting beyond one end of said shoe portion for engagement under conduit to apply bending force thereto in cooperation with said bottom surface and a supporting surface overlain by the conduit, said tool being characterized by:
    A. said handle supporting portion having thereon a plurality of straight and narrow ridges that define first sighting line segments which
        (1) are contained in a sighting plane parallel to said plane of symmetry,
        (2) extend at acute angles to one another, and
        (3) diverge downwardly from a point near the top of said handle supporting portion;
    B. said shoe portion having thereon a like plurality of straight and narrow ridges
        (1) which are spaced apart along the length of the shoe portion, and
        (2) each of which defines a second sighting line segment that
            (a) is contained in said sighting plane, and
            (b) is in lengthwise alignment with one of said first sighting line segments and cooperates therewith when extending perpendicular to a supporting surface to identify one of said bend angles.

2. The tool of claim 1, further characterized by: each of said ridges on the shoe portion extending downwardly far enough to have its bottom end substantially at the bottom of the shoe portion.

3. The tool of claim 1 wherein one of said ridges on the handle supporting portion extends downwardly along the full length of it, parallel to its axis, and is continuous with a longitudinally aligned one of said ridges on the shoe portion.

4. The tool of claim 1, further characterized by: said point being substantially concentric to said arc on which said bottom surface is lengthwise curved.

5. A tool for bending conduit and the like, of the type comprising an elongated body having an arcuate bottom surface against which conduit is forced for producing a bend therein and which defines a downwardly opening conduit receiving groove that extends lengthwise along the body and is from side to side symmetrical to a plane of symmetry substantially contained in the body, said body also having a conduit engaging hook on one end thereof and further having an upwardly projecting handle supporting portion that has its axis contained in said plane, said tool being characterized by:
    A. said body having at one side thereof surfaces with elongated edges that define a plurality of sighting lines
        (1) which lie in a sighting plane parallel to said plane of symmetry and
        (2) which extend at acute angles to one another in downwardly divergent relation from a point near the top of said handle supporting portion, and
    B. each said sighting line being defined by
        (1) edge portions of said surfaces that are downwardly adjacent to said point and
        (2) other edge portions of said surfaces that are adjacent to the bottom of the body.

6. The tool of claim 5 wherein said point is on the axis of an arc of curvature of the bottom surface along its length.

7. The tool of claim 5 wherein said elongated edges are defined by elongated ridges formed in one piece with said body.

8. The tool of claim 5 wherein said body also has corresponding elongated edges at the other side thereof.

9. A tool for bending conduit and the like, comprising a body having a conduit engaging hook at a front end thereof, a pair of flange-like lower body portions extending rearward from said hook, each of which has a convexly arcuate bottom edge and between which there is a bending surface, and an upwardly projecting handle supporting portion for rocking said bottom edges on a supporting surface that is overlain by a conduit which said hook engages, to force the conduit into bending engagement with said bending surface, said tool being characterized by:
    (1) a first ridge portion on the body, on at least one of said flange-like lower body portions, adjacent to said bottom edge thereof, for indicating by its proximity to a supporting surface that a predetermined bend angle has been imparted to conduit being bent by the tool; and
    (2) a second ridge portion on said handle supporting portion, aligned with said first ridge portion and cooperating therewith to define a sighting line which is perpendicular to said supporting surface at said bend angle.

* * * * *